US006436878B1

(12) United States Patent
Wang et al.

(10) Patent No.: US 6,436,878 B1
(45) Date of Patent: Aug. 20, 2002

(54) RHEOLOGY STABILIZER FOR HIGH-TEMPERATURE HIGH-PRESSURE HIGH-MINERALIZED DEGREE DRILLING FLUIDS

(75) Inventors: Bin Wang; Feng Wang, both of Dalian City, Liaoning Province 116023 (CN)

(73) Assignees: Bin Wang; Yuanlai Deng; Feng Wang, all of Dalian (CN)

( * ) Notice: Subject to any disclaimer, the term of this patent is extended or adjusted under 35 U.S.C. 154(b) by 134 days.

(21) Appl. No.: 09/607,185

(22) Filed: Jun. 29, 2000

(30) Foreign Application Priority Data

Mar. 2, 2000 (CN) .......................... 00103372 A

(51) Int. Cl.$^7$ .............................. C09K 7/00; C08F 2/00; C08F 122/40
(52) U.S. Cl. .................. 507/119; 507/120; 507/121; 507/122; 526/233; 526/262; 526/287
(58) Field of Search ................ 526/233, 262, 526/287; 507/119, 120, 121, 122

(56) References Cited

U.S. PATENT DOCUMENTS

| | | | |
|---|---|---|---|
| 3,730,900 A | 5/1973 | Perricone et al. ............ 252/3.5 |
| 4,207,405 A | 6/1980 | Masler, III et al. ......... 525/328 |
| 4,239,648 A | 12/1980 | Marshall et al. ............ 252/389 |
| 4,366,072 A | 12/1982 | McLaughlin et al. ...... 252/8.55 |
| 4,478,727 A | 10/1984 | Turner et al. ................ 252/8.5 |
| 4,581,147 A | 4/1986 | Branch, III .................. 252/8.5 |
| 4,710,555 A | * 12/1987 | Peiffer et al. ................ 526/287 |
| 4,726,906 A | * 2/1988 | Chen et al. .................. 507/121 |
| 4,812,244 A | 3/1989 | Lawson et al. .......... 252/8.514 |
| 5,032,295 A | * 7/1991 | Matz et al. .................. 507/122 |
| 5,096,603 A | * 3/1992 | Peiffer et al. ............... 507/122 |
| 5,130,389 A | * 7/1992 | Ahmed et al. .............. 526/287 |
| 5,160,642 A | 11/1992 | Schield et al. ........... 252/8.551 |
| 5,510,436 A | * 4/1996 | Hille et al. .................. 526/287 |
| 5,866,664 A | * 2/1999 | McCallum, III et al. ..... 526/233 |

* cited by examiner

Primary Examiner—Philip Tucker
(74) Attorney, Agent, or Firm—Christie, Parker & Hale, LLP

(57) ABSTRACT

The invention relates to a rheology stabilizer or thinner for high-temperature high-pressure high-mineralized degree drilling fluids, methods of their preparation and use. The rheology stabilizer is a copolymer synthesized by an olefinic acid, ester of an olefinic acid, a sulfonic acid containing unsaturated linkage(s), an amide or imide containing unsaturated linkage(s), a quaternary compound containing olefinic linkage(s) reacting chemically with phosphorous acid or hypophosphorous acid, more particularly, copolymer of acrylic acid, 2-hydroxypropyl acrylate, N-(4-sulfophenyl)-maleimide, allyltrimethylammonium chloride and phosphorous acid. The copolymers have very high resistance to high-temperature high-pressure high-valence ions, can high-effectively adjust the rheology and thixotropy of drilling fluids, and can be used as the rheology stabilizer, thinner, clay and shale stabilizer of drilling fluids.

6 Claims, No Drawings

RHEOLOGY STABILIZER FOR HIGH-TEMPERATURE HIGH-PRESSURE HIGH-MINERALIZED DEGREE DRILLING FLUIDS

FIELD OF THE INVENTION

This invention relates to drilling fluid additives and methods of their preparation and use thereof. More particularly, the invention relates to a drilling fluid rheology stabilizer or drilling fluid thinner and methods of their preparation and use of the same. The inventive drilling fluid additives are used as the rheology stabilizer, thinner, clay and shale stabilizer of drilling fluids in drilling and extracting petroleum, natural gas, geothermal fluids and underground water for more effectively drilling wells.

BACKGROUND OF THE INVENTION

When drilling subterranean wells in order to extract petroleum, natural gas, geothermal fluids and underground water, a fluid is pumped into drill stem to be spouted out from bit nozzles. The fluid returns to the surface of the well through the annulus of the borehole, is centrifuged separation and filtered through screen, is adjusted the fluid to the desired properties, and is again pumped into drill stem. The circulated fluid is referred to as drilling fluid. The functions of the drilling fluid are: (1). to provide hydrostatic pressure to the borehole to prevent the hole from caving in or blowing out during the use of high pressure fluids: (2). to cool and lubricate the drill bit and stem; (3). to suspend the cuttings and solid particles such as barite, transport the cuttings, and clean the borehole; (4). to protect the borehole wall, prevent the landfall; and (5). to prevent the drilling fluid from flowing-off borehole and flowing the external fluid in borehole. The drilling fluids must have excellent rheology and necessary thixotropy for performing the functions of the drilling fluids.

The rheology of the drilling fluids can be expressed as apparent viscosity, plastic viscosity, yield point and gel strength. The apparent viscosity or resistance to flow of drilling fluids is the result of two properties, plastic viscosity and yield point. Each of these two properties represents a different source of resistance to flow. Plastic viscosity is a property related to the concentration of solids in the fluid, whereas yield point is a property related to the interparticle forces. Gel strength, on the other hand, is a property that denotes the thixotropy of fluid at rest.

The derivatives of lignin, derivatives of lignite, derivatives of tannin and polyphosphates are used to control the rheology and thioxotropy of drilling fluids. However, the above-mentioned additives lose their deflocculated function when temperature of drilling fluid heighten during the drilling deep wells or the concentration of contaminants such as salts increases. Polyacrylates exhibit excellent thinning and temperature stability properties, but they are sensitive to salts such as calcium salts.

The hydrophilic groups and sulfo- group [—$SO_3H$] of high salts-resistance are incorporated in the synthetic materials for improving high-temperature and salts-resistance of drilling fluids. U.S. Pat. No. 3,730,900 (Alphonse C. Perricone) discloses styrene sulfonic acid-maleic anhydride copolymer as a colloidal stabilizer. U.S. Pat. No. 4,478,727 (S. Richard Turner) discloses sodium styrene sulfonate-co-N-(4-sulfophenyl)-maleimide for adjusting rheology of drilling fluids. U.S. Pat. No. 4,581,147 (Homer Branch) discloses a copolymer of sulfonated styrene and maleimide to be effective dispersant. U.S. Pat. No. 4,812,244 (Horace F. Lawson) discloses a blend of sulfonated styrene-maleimide copolymer and copolymer of acrylic acid and acrylate for improving rheology of drilling fluids.

It is necessary that drilling fluid rheology stabilizer or drilling fluid thinner adjust drilling fluid rheology when solids of drilling fluid can not be reduced because incursion and dispersion of cutting in drilling wells. The above-mentioned drilling fluid rheology stabilizers or thinners are anionic, can take apart the card house-like structure built by clay particles, adjust rheology of drilling fluid, but, reduce the drilling fluid property of inhibiting clay, result in increasing yield point, and thereby, hardly achieve low solids content of drilling fluid.

The cationic polymer clay stabilizers are prepared for inhibiting dispersion and expansion of clay. U.S. Pat. No. 4,366,072 (Homer C. HcLaughline) discloses polydimethyldiallylammonium chlorides as clay stabilizer. U.S. Pat. No. 5,160,642 (John A. Schield) discloses a quanternary ammonium salt of an imide of polymaleic anhydride as clay stabilizer. The quanternary salts can inhibit dispersion and expansion of clay, but instead, do not reduce viscosity of drilling fluids.

In order to increase calcium tolerance, some compounds are synthesized. U.S. Pat. No. 4,207,405 (William F. Masler) discloses a polymer of polymaleic anhydride and phosphorous acid. U.S. Pat. No. 4,239,648 (Alan Marshall) discloses polymer of acrylic acid and hypophosphorous acid. The polymers have very high salt-resistance, but do not reduce viscosity of drilling fluids.

The object of the present invention is to provide high-temperature high-pressure high-mineralized degree drilling fluid rheology stabilizers and methods of preparing the same. The drilling fluid rheology stabilizer or drilling fluid thinner can high-efficiently adjust rheology of drilling fluids at high-temperature high-pressure encountered in depth wells and high-mineralized degree, remarkably reduce viscosity of drilling fluid, stabilizes caly and shale, and more efficiently raise the speed of drilling well.

SUMMARY OF THE INVENTION

An object of the present invention is to provide a drilling fluid additive or drilling fluid rheology stabilizer or drilling fluid thinner.

Another object of the invention is to provide a high efficient stable rheology stabilizer or thinner of drilling fluids at high-temperature high-pressure environment encountered in drilling deep well.

Another object of the invention is to provide a high-temperature high-pressure high-mineralized degree drilling fluid rheology stabilizer or drilling fluid thinner.

Another object of the invention is to provide a method of producing drilling fluid rheology stabilizer or thinner for high-temperature high-pressure high-mineralized degree wells.

To achieve these objects and in accordance with the purpose of the invention, the present invention provides a high-temperature high-pressure high-mineralized degree drilling fluid rheology stabilizer or thinner that is a copolymer synthesized by an olefinic acid, ester of an olefinic acid, a sulfonic acid containing unsaturated linkage(s), an amide or imide containing unsaturated linkage, a quanternary compound containing olefinic linkage(s) reacting chemically with phosphorous acid or hypophosphorous acid.

In another embodiment, the present invention provides a high-temperature high-pressure high-mineralized degree drilling fluid rheology stabilizer or thinner that is a copolymer synthesized by acrylic acid, 2-hydroxypropyl acrylate, N-(4-sulfophenyl)-maleimide, allyltrimethyl ammonium chloride reacting chemically with phosphorous acid. The molecule of the copolymer contains 20–80 monomer units, weight average molecular weights of which are between about 3,000 to 11,800, preferably between about 3,400 to 6,000.

In another embodiment, the present invention provides a high-temperature high-pressure high-mineralized degree drilling fluid rheology stabilizer or thinner that is a copolymer synthesized by acrylic acid, 2-hydroxypropyl acrylate, acrylamide, 2-sulfopropyl acrylate, diallyldimethyl ammonium chloride reacting chemically with phosphorous acid. The molecule of the copolymer contains 26–90 monomer units, a weight average molecular weight of which are between about 2,600 to 11,000, preferably between abut 5,200 to 8,000.

The invention provides methods of producing the inventive high-temperature high-pressure high-mineralized degree drilling fluid rheology stabilizer or thinner comprising the steps of adding an olefinic acid, ester of an olefinic acid, an amide or imide containing unsaturated linkage(s), a sulfonic acid containing unsaturated linkage(s), a quanternary compound containing olefinic linkage, phosphorous acid or hypophosphorous acid to a reaction vessel charged with a special solvent, adding a polymerization catalyst, heating the reactants in the solvent to initiate polymerization reaction, maintaining a period of the reaction, adding a chain termination agent, separating the solvent from the mixture, neutralizing the solution with alkali, and spray-drying with a spray-drying instrument to yield the powder product.

DETAILED DESCRIPTION OF THE INVENTION

The present invention provides a high-temperature high-pressure high-mineralized degree drilling fluid rheology stabilizer or a drilling fluid thinner comprising a copolymer synthesized by an olefinic acid, ester of an olefinic acid, a sulfonic acid containing unsaturated linkage(s), an amide or imide containing unsaturated linkage(s), a quanternary compound containing olefinic linkage(s) reacting chemically with one of either phosphorous acid or hypophosphorous acid, having the following formula:

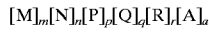

wherein M, N, P, Q, R, A respectively represent monomer units derived from an olefinic acid, ester of an olefinic acid, a sulfonic acid containing unsaturated linkage(s), an amide or imide containing unsaturated linkage(s), a quanternary compound containing olefinic linkage(s), one of either phosphorous acid or hypophosphorous acid in the molecule of the copolymer; m, n, p, q, r and a respectively represent number of the olefinic acid, ester of the olefinic acid, the sulfonic acid containing unsaturated linkage(s), the amide or imide containing unsaturated linkage(s), the quanternary compound containing olefinic linkage(s), the phosphorous acid or hypophosphorous acid monomer units in the moleucle of the copolymer; M, N, P, Q, R, A are connected in any sequences in the molecule of the copolymer. The said olefinic acid includes acrylic acid and methacrylic acid; the ester of the olefinic acid includes 2-hydroxypropyl acrylate, 2-hydroxyethyl acrylate, 2-hydroxypropyl methacrylate and 2-hydroxyethyl methacrylate; the amide or imide containing unsaturated linkage(s) includes acrylamide and methacrylamide; the sulfonic acid containing unsaturated linkage(s) includes 2-sulfopropyl acrylate, 2-sulfoethyl acrylate, 2-sulfopropyl methacrylate, 2-sulfoethyl methacrylate, N-(4-sulfophenyl)-maleimide; the quanternary compound containing olefinic linkage(s) includes allyltrimethylammonium chloride, allyltrimethyl ammonium bromide, allyltrimethylammonium iodide, allyltrimethylammonium bicarbonate, diallyldimethylammonium chloride, diallyldimethylammonium bromide, diallyldimethylammonium iodide, diallyldimethylammonium bicarbonate; the said phosphorous acid or hypophosphorous acid includes phosphorous acid, sodium phosphite, potassium phosphite, ammonium phosphite, hypophosphorous acid, sodium hypophosphite, potassium hypophosphite, ammonium hypophosphite. It is critical that the polymer includes at least two kinds of monomer units, provided that it at least a contains quanternary group, a phosphino group, a carboxyl group, a sulfo-group, and one of either amido or imido group.

In another embodiment, the present invention provides a high-temperature high-pressure high-mineralized degree drilling fluid rheology stabilizer or thinner that is a copolymer synthesized by acrylic acid, 2-hydroxypropyl acrylate, N-(4-sulfophenyl)-maleimide, allyltrimethyl ammonium chloride reacting chemically with phosphorous acid; the molecule of the copolymer has from 20 to 80 monomer units in order to adjust effectively rheology of drilling fluid. The copolymer has the formula:

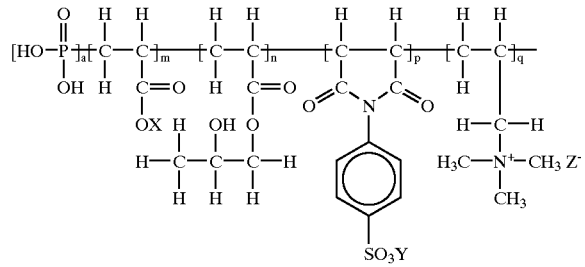

wherein X and Y are independently selected from the group consisting of H, Na, K, NH$_4$; Z is selected from the group consisting of Cl, Br, I, HCO$_3$; m=6–18, preferably m=8–12; n=3–10, preferably n=2–6; p=6–22, preferably p=8–12; q=3–20, preferably q=4–6, wherein m:n:p:q=(6–18):(3–10):(6–22):(3–20), preferably (8–12):(2–6):(8–12):(4–6), mole ratio of a: (m+n+p+q) is 1:7, preferably 1:6, weight average molecular weights of the copolymer are 3,000–11,800, preferably 3,400–6,000. The above monomer units are in any positions in molecule of the copolymer.

In another embodiment, the present invention provides a high-temperature high-pressure high-mineralized degree drilling fluid rheology stabilizer or thinner copolymer synthesized by acrylic acid, acrylamide, 2-hydroxypropyl acrylate, 2-sulfopropyl acrylate, diallyldimethylammonium chloride reacting chemically with phosphorous acid; the molecule of the copolymer has from 26 to 90 monomer units. The monomer units are in any positions in molecule of the copolymer. The copolymer has the formula.

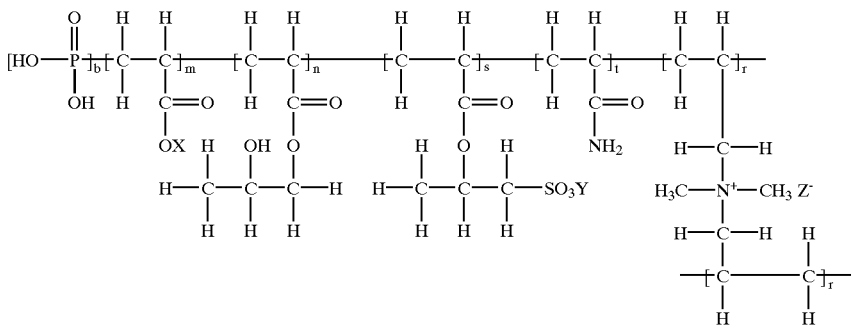

wherein X and Y are independently selected from the group consisting of H, Na, K, $NH_4$; Z is selected from the group consisting of Cl, Br, I, $HCO_3$; m=8–21, preferably m=10–16; n=3–10, preferably n=5–6, s=8–20, preferably s=12–13; t=1–10, preferably t=3–6; r=6–22, preferably r=8–18; wherein mole ratio of m:n:s:t:r is (8–21):(3–10):(8–20):(1–10):(6–22), preferably (10–16):(5– 6):(12–13):(3–6):(8–18); b:(m+n+s+t+r)=1:7, preferably 2:9; weight average molecular weights of the copolymer are 2,600–11,000, preferably 5,200–8,000.

The present invention provides methods of preparing high-temperature high-pressure high-mineralized degree drilling fluid rheology stabilizer or thinner. The methods comprise the steps of adding reactants of the olefinic acid, the amide or imide containing unsaturated linkage(s), the ester of the olefinic acid, the sulfonic acid containing unsaturated linkage(s), the quanternary compound containing olefinic linkage(s), phosphorous acid or hypophosphorous acid to a reaction vessel charged with the solvent, adding the polymerization catalyst, heating the materials in the reaction vessel to such temperature that the polymerization is initiated, maintaining a period of the reaction at the said temperature, adding the chain termination agent, separating the solvent from the mixture, neutralizing the solution with alkali, spray-drying the solution to powder product using a spray-drying instrument. The said solvent is inert to the reactants and is selected from 1,2-dichloroethane, 1,1,1-trichloroethane, benzene, xylene, n-hexane, carbontetrachloride and water; the polymerization catalysts is selected from free radical initiators or redox initiators such as benzoyl peroxide, lauryl peroxide, hydrogen peroxide, sodium persulfate, ammonium persulfate in order to prompt the polymerization; chain termination agent is selected from mercaptan, benzyl alcohol, benzaldehyde and thioglycolic acid; the content of reactants is 10–100 wt % based on the total weight of the solution of the reactants in said solvent, preferably 30–50wt %; amount of the catalyst to be added is 0.1–20wt % based on the weight of the total reactants, preferably 1–3wt %; the reactive temperature is 10–200° C., preferably 50–110° C.; the reactive time is 10 seconds to 10 hours, preferably 2–3 hours; the said alkali is sodium hydroxide, potassium hydroxide, ammonium hydroxide; the solution is neutralized to pH3–13, preferably pH8–11; temperature of inlet of the spray-drying instrument is 150–500° C., preferably 200–300° C., outlet 40–120° C., preferably 60–90° C.; particle size of the product is 10–160 mesh, preferably 30–60 mesh.

In methods of preparing the inventive drilling fluid rheology stabilizer, the operational procedures are selected independently as follows: (1) adding reactants in accordance with the any sequences, heating to initiative temperature, adding the polymerization catalyst and adding the chain termination agent; (2) adding the reactants and the chain termination agent, heating to initiative temperature, adding the polymerization catalyst; (3) adding the olefinic acid, the ester of olefinic acid, the amide or imide containing unsaturated linkage(s), sulfonic acid containing unsaturated linkage(s), the quanternary compound containing olefinic linkage, the polymerization catalyst, maintaining reaction temperature and time, and adding phosphorous acid or hypophosphorous acid, adding chain termination agent; (4) adding the olefinic acid, the ester of the olefinic acid, the amide or imide containing unsaturated linkage(s), the sulfonic acid containing unsaturated linkage(s), the quanternary compound containing olefinic linkage, the polymerization catalyst, the chain termination agent, maintaining the reaction temperature and time, and adding phosphorous acid or hypophosphorous acid.

The invention will be further illustrated by the following examples which are intended to be merely explanation of the present invention, and are not to be construed in a limiting sense.

EXAMPLE 1

To a reaction vessel equipped with an agitator, a reflux condenser, a temperature gauge, and heating means was charged with 800grams of $H_2O$, 36 grams of acrylic acid, 6.5 grams of 2-hydroxypropyl acrylate, 127 grams of N-(4-sulfophenyl)-maleimide, 68 grams of allyltrimethylammonium chloride and 28 grams of phosphorous acid and 5 grams of benzoyl peroxide. The reactor contents was heated to 60° C. while being continuously agitated. The reaction temperature was maintained in the range 60–65° C. for 2 hours. Ten grams of thioglycolic acid were added to the reaction vessel. The reaction mixtures were heated for 0.5 hours at a temperature of 60–65° C. with continued agitation. The obtained solution was neutralized with 30 wt % aqueous solution of sodium hydroxide to pH=9.0, and dried at 70° C. to thereby yield 278 grams of powder product.

EXAMPLE 2

To a reaction vessel equipped with an agitator, a reflux condenser, a temperature gauge, and heating means was charged with 1600 weight parts of $H_2O$, 36 weight parts of acrylic acid, 65 weight parts of 2-hydroxypropyl acrylate, 131 weight parts of 2-sulfopropyl acrylate, 35 weight parts of acrylamide, 81 weight parts of dimethyldiallylammonium chloride and 33 weight parts of phosphorous acid. The reactor contents was heated to 50° C. while being continuously agitated. Seven weight parts of hydrogen peroxide were also added to the reaction vessel and refluxed at 70° C. for 2 hours. Seven weight parts of benzaldehyde solution was added therein while being agitated for 30 minutes, 30 wt % of aqueous sodium hydroxide solution was added therein, and neutralized to pH=8.0. The solution was spray-dried to yield 472 weight parts powder product.

EXAMPLE 3

Evaluation of Rheological Performance

Equipment was used as follows:
Fann® Model 35SA Viscometer (Fann Instrument Co., U.S.A.)
Roller Oven (Fann Instrument Co., U.S.A.)
Multi-Mixer (Fann Instrument Co., U.S.A.)
Aging Cell (Fann Instrument Co., U.S.A.)
Test Method was used as follows:
API Recommended Practice Standard Procedure for Field Testing Drilling Fluids (API RP 13B Eleventh Edition May 1, 1985)
1. Tests in a Fresh Water Mud
Prepare base mud: 458 grams of water, 1.38 grams of sodium carbonate (anhydrous) and 41 grams of bentonite are added gradually into a stainless steel beaker of Multi-Mixer while being continuously agitated 20 minutes. This slurry is then aged overnight at ambient temperature.

Preparation of Testing Mud: 0.5 grams of sample and 500 grams of base mud are added into a stainless steel beaker of Multi-Mixer and pH is adjusted to 10.0 to 10.5 with sodium hydroxide while being agitated 20 minutes. The mud is aged overnight at ambient temperature to ensure chemical equilibrium. The Theological properties of the mud are measured at ambient temperature. The mud containing sample is placed in aging cell and is pressurized with nitrogen gas. The cell is then placed in a Roller Oven maintained at 240° C. for rolling 16 hours. The pH of the cooled mud is re-adjusted to 10.0–10.5 with sodium hydroxide while being agitated for 20 minutes and the Theological properties are measured using Fann® Model 35SA Viscometer.

TABLE 1

| | | Tests in A Fresh Water Mud | | | | | | | | | |
|---|---|---|---|---|---|---|---|---|---|---|---|
| | Quantity of | Ambient temperature | | | | | After rolling 16 h. at 240° C. | | | | |
| Additive | additive (wt %) | AV | PV | YP | Gels | pH | AV | PV | YP | Gels | pH |
| Base Mud | 0.1 | 40.5 | 10.0 | 35.0 | 68.0/96.0 | 10.0 | too thick to measure | | | | |
| Example 1 | 0.1 | 6.0 | 5.0 | 1.0 | 0/0 | 10.0 | 7.0 | 6.0 | 1.0 | 0.5/0.5 | 9.8 |
| Example 2 | 1.0 | 6.2 | 5.5 | 0.75 | 0/0 | 10.0 | 7.5 | 7.0 | 0.5 | 0.5/0.5 | 9.6 |
| FeCrLs | 1.0 | 11 | 5.0 | 6.0 | 7.0/10.0 | 10.0 | too thick to measure | | | | |
| SSM | 1.0 | 11.5 | 10.5 | 1.0 | 1.0/8.0 | 10.0 | 24.5 | 12.0 | 12.0 | 28.0/38.0 | 9.6 |

Notes:
FeCrLs—Ferrochromelignosulfonate;
SSM—Styrene sulfonic acid-maleic anhydride copolymer The results of test (1) in the comparison to commercial FeCrLs and SSM are shown in Table 1. The inventive additive significantly improves rheological properties of the drilling fluid.

2. Test in Saturated NaCl Brine Mud

Saturated NaCl brine mud composition: aqueous saturated NaCl (2610 g.), sodium carbonate (anhydrous 5.8 g.), bentonite (172 g).

TABLE 2

| | | Test in Saturated NaCl Brine Mud | | | | | | | | | |
|---|---|---|---|---|---|---|---|---|---|---|---|
| | Quantity of | Ambient temperature | | | | | After rolling 16 h. at 240° C. | | | | |
| Additive | additive (wt %) | AV | PV | YP | Gels | pH | AV | PV | YP | Gels | pH |
| Example 1 | 0.1 | 5.5 | 4.5 | 1.0 | 2.0/30 | 10.0 | 6.5 | 6.0 | 0.5 | 2.5/3.5 | 9.8 |
| Example 2 | 0.1 | 6.0 | 5.5 | 0.5 | 2.0/35 | 10.0 | 6.7 | 6.7 | 0.25 | 3.0/3.5 | 9.8 |

3. Tests in Aqueous Saturated Gypsum Mud
Aqueous saturated gypsum mud composition: fresh water (1920 g.), gypsum (3.84 g.), sodium carbonate (anhydrous 5.8 g.) and bentonite (172 g.).

TABLE 3

Tests in Saturated Gypsum Water Mud

| Additive | Quantity of additive (wt %) | Ambient temperature | | | | | After rolling 16 h. at 240° C. | | | | |
|---|---|---|---|---|---|---|---|---|---|---|---|
| | | AV | PV | YP | Gels | pH | AV | PV | YP | Gels | pH |
| Example 1 | 0.1 | 6.0 | 5.0 | 1.0 | 0.5/0.5 | 10.0 | 6.3 | 5.6 | 0.7 | 0.5/0.5 | 10.0 |
| Example 2 | 0.1 | 6.6 | 5.7 | 0.9 | 0.5/0.5 | 10.5 | 7.2 | 6.5 | 0.75 | 0.5/1.0 | 9.8 |

4. Tests in Saturated NaCl, $CaCl_2$ and Barite Brine Mud

Base mud composition: aqueous saturated NaCl solution (136 kg.), aqueous saturated $CaCl_2$ solution (62 kg), STF (1.5 kg.), STV 1.5 kg., bentonite (8.67 kg.), and barite 96.39 kg.

TABLE 4

Tests in Saturated NaCl, $CaCl_2$ Brine, Barite Mud

| Additive | Quantity of additive (wt %) | Ambient temperature | | | | | After rolling 16 h. at 240° C. | | | | |
|---|---|---|---|---|---|---|---|---|---|---|---|
| | | AV | PV | YP | Gels | pH | AV | PV | YP | Gels | pH |
| Base Mud | | 160 | 24 | 136 | 210/280 | 10.0 | too thick to measure | | | | |
| Example 1 | 0.1 | 14.5 | 13.0 | 1.5 | 2.4/4.0 | 10.0 | 15.5 | 13.0 | 2.5 | 3.0/6.0 | 9.8 |
| Example 2 | 0.1 | 15.0 | 13.0 | 2.0 | 3.0/8.0 | 10.0 | 16.5 | 13.0 | 3.5 | 3.0/6.6 | 9.6 |
| SSM | 3.0 | 23.0 | 16.0 | 7.0 | 26.0/36.0 | 10.0 | 22.5 | 16.0 | 6.5 | 32.0/46.0 | 9.6 |

Note:
STF-fluid loss control agent, STV-Viscosifier

The results of test from above items 1 to 4 have demonstrated that the inventive rheology stabilizer or thinner significantly improve the rheological properties of drilling fluids, and particularly, have excellent characteristics as mentioned above at high-temperature high-pressure and high-mineralized drilling wells.

EXAMPLE 4

This Test is Intended to Show Inhibition Rate of Swelling of Clay and Shale

Ten grams of bentonite dried at 105±2° C. for 4 hours are charged into the measuring bucket, then maintaining 2.86 MPa pressure for 5 minutes. The measuring bucket containing the rock core is mounted on shale expansion instrument, 5 wt % concentration of the solution of sample is dripped into the measuring bucket, and the linear expansion is determined for 7 hours. By the same means, the linear expansion of dripping water is determined.

Relative rate of inhibiting expansion=$(\Delta H_1-\Delta H_2)/\Delta H_1 \times 100\%$ wherein:
$\Delta H_1$—value of linear expansion of deionized water—rock core
$\Delta H_2$—value of linear expansion of 5% sample solution—rock core

TABLE 5

Relative Rate of Inhibiting Shale Expansion

| Additive | Relative rate of inhibiting clay and shale expansion |
|---|---|
| Example 1 | 86% |
| Example 2 | 82% |

Clearly, the inventive additive can remarkably inhibit swelling expansion of clay and shale.

The inventive high-temperature high-pressure high-minearalized degree drilling fluid rheology stabilizers or thinners are amphoteric ion polymers which have strong complex ability. The polymers contain anionic carboxyl [—COOH] and sulfo-groups [—$SO_3H$] groups, quanternary cations, and hydroxy [—OH], amido [—$NH_2$], phosphono [—$PO(OH)_2$], and ester groups that were adsorbed strongly on the flat surfaces of clay particles with negative charges and on the edges with positive charges, the card house-like structure built by clay particles were taken apart, and clad particles, therefore, the inventive additives can high-effectively adjust the Theological properties of drilling fluids and have high resistance to high concentration of salt and high valence ions. Since the inventive additives have excellent performances under conditions of high-temperature high-pressure high-mineralized degree, they can be used for drilling fluid rheology stabilizer or thinner and clay and shale stabilizer.

What is claimed is:

1. A drilling fluid rheology stabilizer comprising a copolymer of:
    an olefinic acid;
    an ester of an olefinic acid, wherein the ester contains a hydroxyl;
    a sulfonic acid containing at least one unsaturated linkage;
    a nitrogen compound selected from the group consisting of amides, imides, and combinations thereof, wherein the nitrogen compound contains at least one unsaturated linkage;
    a quaternary compound containing at least one olefinic linkage; and
    a phosphorus compound selected from the group consisting of phosphites, hypophosphites, phosphorous acid, hypophosphorous acid, and combinations thereof.

2. A drilling fluid rheology stabilizer according to claim 1, wherein:
    the first olefinic acid is selected from the group consisting of acrylic acid, methacrylic acid, and combinations thereof;
    the ester is selected from the group consisting of 2-hydroxypropyl acrylate, 2-hydroxyethyl acrylate, 2-hydroxypropyl methacrylate, 2-hydroxyethyl methacrylate, and combinations thereof;
the nitrogen compound is selected from the group consisting of acrylamide, methacrylamide, and combinations thereof;
the sulfonic acid is selected from the group consisting of 2-sulfopropyl acrylate, 2-sulfoethyl acrylate, 2-sulfopropyl methacrylate, 2-sulfoethyl methacrylate, N-(4-sulfophenyl)-maleimide, and combinations thereof;
the quaternary compound is selected from the group consisting of allyltrimethylammonium chloride, allyltrimethylammonium bromide, allyltrimethylammonium iodide, allyltrimethylammonium, bicarbonate, diallyldimethylammonium chloride, diallyldimethylammonium iodide, diallyldimethylammonium bicarbonate, and combinations thereof; and
the phosphorus compound is selected from the group consisting of phosphorous acid, sodium phosphite, potassium phosphite, ammonium phosphite, hypophosphorous acid, sodium hypophosphite, potassium hypophosphite, ammonium hypophosphite, and combinations thereof.

3. A drilling fluid rheology stabilizer according to claim 1 comprising a copolymer of:
acrylic acid; 2-hydroxypropyl acrylate; N-(4-sulfophenyl)-maleimide; allyltrimethylammonium chloride; and phosphorous acid, having the formula:

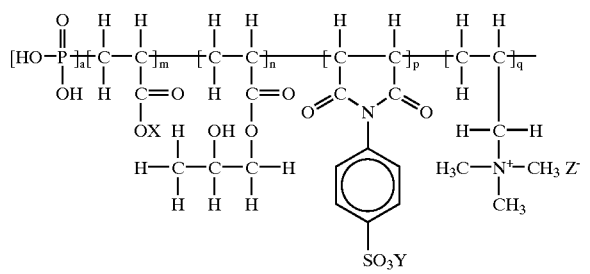

wherein X and Y are independently selected from the group consisting of H, Na, K, and NH$_4$; Z is selected from the group consisting of Cl, Br, I, and HCO$_3$; m is between 6 and 18, n is between 3 and 10, p is between 6 and 22, q is between 3 and 20; the mole ratio of a:(m+n+p+q) is 1:7; and the copolymer has between 20 and 80 monomer units in the molecule of the copolymer and a weight average molecular weight of between 3,000 and 11,800.

4. A drilling fluid rheology stabilizer according to claim 1 comprising a copolymer of acrylic acid, 2-hydroxypropyl acrylate, 2-sulfopropyl acrylate, acrylamide, diallyldimethylammonium chloride and phosphorous acid, having the formula:

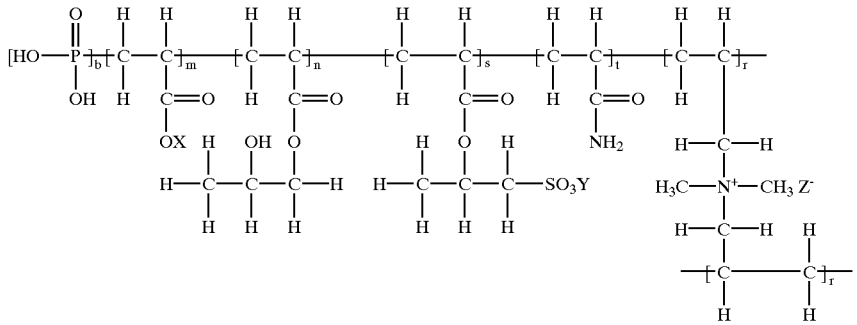

wherein X and Y are independently selected from the group consisting of H, Na, K, and NH4; Z is selected from the group consisting of Cl, Br, I, HCO$_3$, and OH; m is between 8 and 21, n is between 3 and 10, s is between 8 and 20, t is between 1 and 10, r is between 6 and 22; the mole ratio of b:(m+n+s+t+r) is 1:7; and the molecule of the copolymer has between 26 and 90 monomer units and a weight average molecular weight of between 2,600 and 11,000.

5. A method of preparing a drilling fluid rheology stabilizer comprising the steps of:
adding to a reaction vessel as reactants: an olefinic acid; an ester of an olefinic acid; a sulfonic acid containing at least one unsaturated linkage; an amide or imide containing at least one unsaturated linkage; a quaternary compound containing at least one olefinic linkage; and a phosphorus compound selected from the group consisting of phosphites, hypophosphites, phosphorous acid, hypophosphorous acid, and combinations thereof;
adding a polymerization catalyst to the reaction vessel;
heating the reactants in the reaction vessel to a reaction temperature and for a period of reaction time sufficient to complete polymerization;
adding a chain termination agent, thereby producing a liquid copolymer;
neutralizing the liquid copolymer with alkali; and
spray-drying the liquid copolymer to yield a powder product.

6. A method of preparing the drilling fluid rheology stabilizer according to claim 5, further comprising the steps of: adding a solvent to the reactants; and removing the solvent after the step of adding a chain termination agent, wherein the solvent is selected from the group consisting of 1,2-dichloroethane, 1,1,1-trichloroethane, benzene, xylene, n-hexane, carbontetrachloride, water, and combinations thereof; the polymerization catalyst is selected from the group consisting of benzoyl peroxide, lauryl peroxide, hydrogen peroxide, sodium persulfate, ammonium persulfate, and combinations thereof; the amount of catalyst added is between 0.1 and 20 wt % of the total weight of the reactants, the chain termination agent is selected from the group consisting of mercaptans, benzyl alcohol, benzaldehyde, thioglycolic acid, and combinations thereof; the reaction temperature is between 10 and 200° C.; the reaction time is between 10 seconds and 10 hours; the alkali is selected from the group consisting of sodium hydroxide, potassium hydroxide, ammonium hydroxide, and combinations thereof; the solution is neutralized to a pH between 3 and 13; the spray-drying step is conducted at an inlet temperature between 150 and 500° C. and an outlet temperature between 40 and 120° C.; and the particle size of the powder is between 10 and 160 mesh.

* * * * *